United States Patent [19]

Emter

[11] Patent Number: 4,901,604

[45] Date of Patent: Feb. 20, 1990

[54] ADJUSTABLE AUTOMATIC DUAL SIDE GRINDER WITH QUICK RETRACT CAM

[76] Inventor: James Emter, 23429 NE. 29th Ave., Ridgefield, Wash. 98642

[21] Appl. No.: 332,034

[22] Filed: Apr. 3, 1989

Related U.S. Application Data

[63] Continuation-in-part of Ser. No. 162,196, Feb. 29, 1988, Pat. No. 4,823,649, which is a continuation-in-part of Ser. No. 788,925, Oct. 18, 1985, Pat. No. 4,846,023.

[51] Int. Cl.$^4$ .............................................. B63D 63/14
[52] U.S. Cl. ...................................................... 76/41
[58] Field of Search .................... 76/37, 39, 40, 41, 42, 76/43, 40, 79, 77, 35, 112; 51/40, 42, 241 S

[56] References Cited

U.S. PATENT DOCUMENTS

4,366,728  1/1983  Beck et al. ................................ 76/41
4,750,387  6/1988  Singer ....................................... 76/37

*Primary Examiner*—Roscoe V. Parker
*Attorney, Agent, or Firm*—Chernoff, Vilhauer, McClung & Stenzel

[57] ABSTRACT

An automatic dual side grinding machine includes a pair of rotary spindles mounted for reciprocating movement with respect to a frame for grinding the teeth of a circular saw from the side. The reciprocating movement is provided by a rotary cam member which provides a program of movement for the spindles in a longitudinal direction wherein the grinding wheels move forward at a first rate of speed for a grinding stroke and move rearward at a second rate of speed for a retraction stroke, the retraction stroke being faster than the forward grinding stroke. The grinding wheels are driven in a rotary fashion by motors affixed to the frame which have output belts looped over pulleys mounted on the ends of the spindles. The pulleys have recessed portions for accommodating the belts and raised beveled edges to prevent the belts from slipping off as the spindles move in forward and reverse motion. A radial angle adjustment feature is provided by a lever arm and a linkage which simultaneously rotates support plates bearing each of the spindles about vertical axes. An improved tangential angle adjustment permits the height of the grinding wheels relative to the saw blade teeth to be adjusted.

13 Claims, 5 Drawing Sheets

ADJUSTABLE AUTOMATIC DUAL SIDE GRINDER WITH QUICK RETRACT CAM

This application is a continuation-in-part of Ser. No. 07/162,196 entitled "IMPROVED AUTOMATIC DUAL SIDE GRINDER" filed Feb. 29, 1988 and now U.S. Pat. No. 4,823,649, which is in turn a continuation-in-part of U.S. patent application Ser. No. 06/788,925 entitled "REGRINDING APPARATUS FOR CIRCULAR SAWS" filed Oct. 18, 1985 and now U.S. Pat. No. 4,846,203.

BACKGROUND OF THE INVENTION

The following invention relates to an automatic dual side grinding machine for resharpening circular saw blades.

The above-mentioned patents, especially U.S. Pat. No. 4,823,649, provides an adjustable dual side grinding machine for circular saws that includes among its features the ability to grind successive teeth of the circular saw with a pair of reciprocating spindles supporting rotary grinding wheels on both the forward and reverse strokes. The purpose of the forward and reverse grinding strokes is to shorten the time necessary to regrind the teeth of the saw. If grinding is accomplished on the forward stroke only, and if the operator must wait for another forward stroke before advancing the next tooth to be ground, the operation will take twice as long as one in which successive teeth are ground on forward and reverse strokes. Another way of approaching this problem is to grind the teeth only on the forward stroke but to provide a quick retract mechanism to shorten the time between forward strokes. An example of this type of quick retract feature is shown in the U.S. Pat. No. 4,750,387 to Swiger. In the Swiger device the grinding wheels are advanced through the forward grinding stroke at a first rate of speed. A sensor detects the completion of this stroke and speeds up the motor to provide a fast retraction stroke thus speeding up the grinding cycle as a whole. The Swiger system, however, depends on the use of an electric motor having variable rates of speed. It is also necessary with the Swiger system to provide sensors to sense the completion of the forward grinding stroke and the rearward quick retract stroke and to signal the motor to change speeds.

The dual side grinder of U.S. Pat. No. 4,823,649 also provides some adjustments, namely, a tangential angle adjustment and a radial angle adjustment. The tangential angle adjustment is provided through a torsion bar which bears against an index finger mounted on a pivot. The torsion bar has a tendency at some settings to become unstable and to give variable readings to a displacement indicator which is calibrated to provide the precise angular adjustment for the index finger.

The, radial angle adjustment of U.S. Pat. No. 4,823,649 is accomplished by separately rotating a pair of cams disposed within slots provided in each of the spindle-supporting base plates to separately alter the radial angle of attack of each of the grinding wheels. This requires separate adjustments for each of the grinding wheels, and gives rise to the possibility that the radial angle for each side of the grinding operation will be unequal. Also, slight differences in the performance or calibration of the gauges on either side of the saw blade could result in differing radial angle adjustments.

In the past the spindles have been driven reciprocally by means of motors having output drive belts and it has been necessary to deal with the problem of placement of the motors. One solution to this problem, as discussed in the application of U.S. Pat. No. 4,846,023, is to suspend the motors below the spindles on plates and allow them to be carried reciprocally along with the spindles as they move relative to the frame. This adds considerable inertia to the spindle assemblies and therefore interferes with the ability of the spindle drive motors to provide an efficient and accurate grinding stroke and/or quick retract stroke.

SUMMARY OF THE INVENTION

The above-noted problems are solved by the invention herein which provides a quick retract stroke without the need for sensors and variable speed electric motors, and provides improved tangential and radial angle adjustments, as well as alleviating the problem of increased mass and inertia in the spindle drive system.

The quick retract feature of the invention includes a frame supporting a pair of spindles with rotary grinding wheels connected to each of the spindles for engaging the teeth of a circular saw, and a reciprocating drive motor which includes a cam for providing a program of movement for the spindles which includes a forward grinding stroke at a first rate of speed and a rearward quick retract stroke at a second faster rate of speed. The cam is a rotary cam which is coupled to a lever arm through a roller which engages a race machined in the cam. A tie rod is coupled from the lever arm to a spindle for effectively coupling the rotary motion of the cam to cause it to drive the spindle longitudinally. A shaft couples this motion to a lever arm plate driving the spindle on the opposite side. The lever arm may be a plate which includes a variable stroke length adjustment by providing apertures at spaced intervals for connection to the tie rod.

An improvement in the radial angle adjustment is provided by mounting both spindle support plates on the frame so that they are simultaneously pivotable about respective vertical axes through an identical radial angle. An adjustable lever arm connected by linkages to the support plates simultaneously pivots the support plates about their respective axes. The lever arm may be connected to a first cam coupled to a second identical cam by a shaft so that both cams rotate the same amount as the lever arm is moved. Both cams may have an output tie rod coupled to the support plates so that movement of the lever arm causes an identical pivoting motion of each support plate about its respective vertical axis. In this way, a single displacement gauge may be mounted on the frame and calibrated to read the radial angle adjustment in degrees for both grinding wheels.

An improved tangential angle adjustment is provided by a lever bar which is rotatably mounted about a pin so as to bear against an index finger mounted on a pivot pin and biased against the bar. The bar may be biased against an adjustment screw by springs so as to stabilize the readings available from a displacement gauge which is calibrated to provide a reading of the tangential angle adjustment.

The spindles may be driven rotatably by respective motors mounted at a fixed location on the frame and coupled to the spindles by a pair of belts. The spindles and the output shafts of the drive motors include pulleys for receiving the belts, and each pulley includes a recessed portion and a raised beveled edge at either end of the recessed portion to prevent the slippage of the belts off of the pulleys as the spindles move reciprocally with respect to the frame. The pulleys may utilize poly-V belts and as such have a series of grooves to accommodate the ridges thereof. The raised beveled edges permit the spindles to move reciprocally while the motors remain fixed, allowing the belts and pulleys to misalign, without the attendant problem of having the belts slip off of the pulleys.

It is an object of this invention to provide a quick retract stroke for a reciprocally-driven dual side grinding machine for circular saws through the use of a shaped cam, which provides a program of movement for the spindles thus obviating the need for sensors, switches and variable speed motors.

A further object of this invention is to provide an improved radial angle adjustment for an automatic dual side grinding machine wherein the movement of a single lever arm may simultaneously alter the radial angle adjustment for each of the grinding wheels.

A still further object of this invention is to provide an improved tangential angle adjustment to provide a stable output reading for a displacement gauge by using a leverage bar biased against an adjustment screw and bearing against an index finger to alter the tangential angle adjustment as the adjustment screw is turned.

Yet a further object of this invention is to provide a fixed rotary drive system for the reciprocating spindles of a dual side grinding machine through the use of a pulley system which resists belt slippage while allowing for the cyclic misalignment caused by the reciprocally moving spindles.

DETAILED DESCRIPTION OF THE INVENTION

Figure 1:
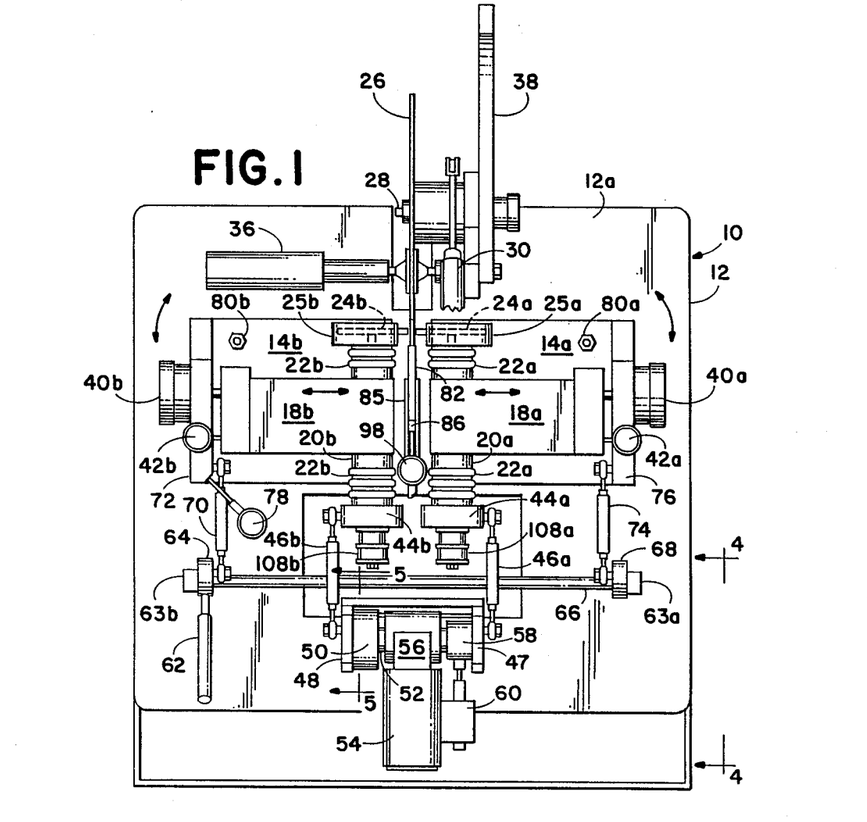
FIG. 1 is a top view of a dual automatic side grinding machine incorporating the present invention.
Figure 2:
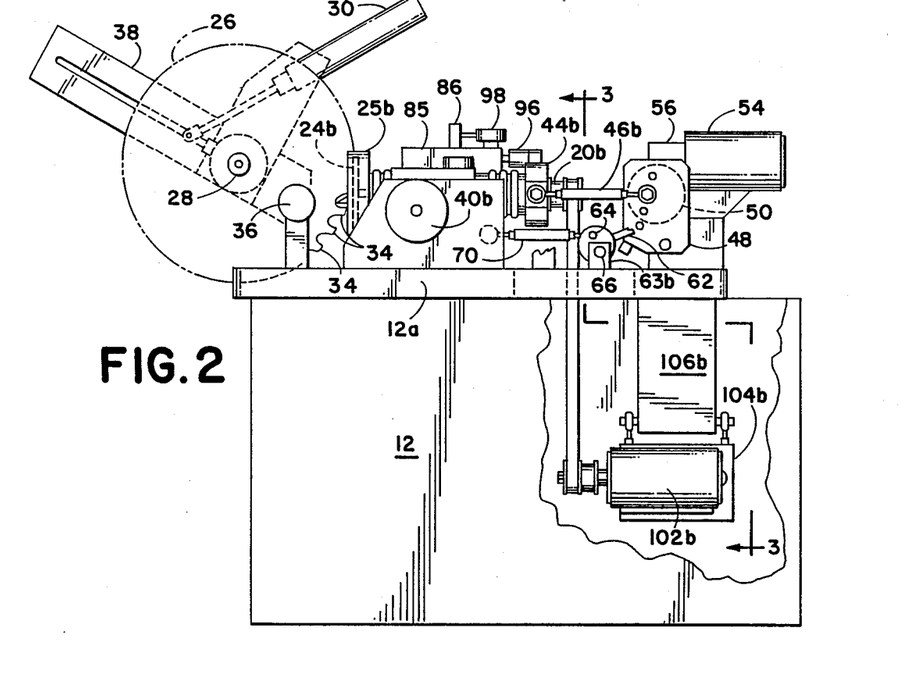
FIG. 2 is a side partial cutaway view of the dual automatic side grinding machine of FIG. 1.
Figure 3:
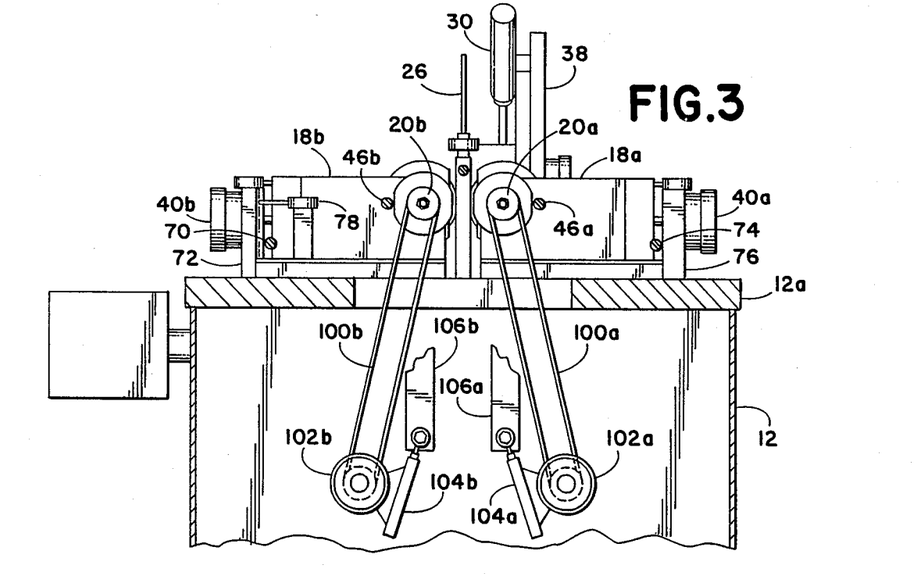
FIG. 3 is a rear partial sectional view taken along lines C—C of FIG. 2.
Figure 6:
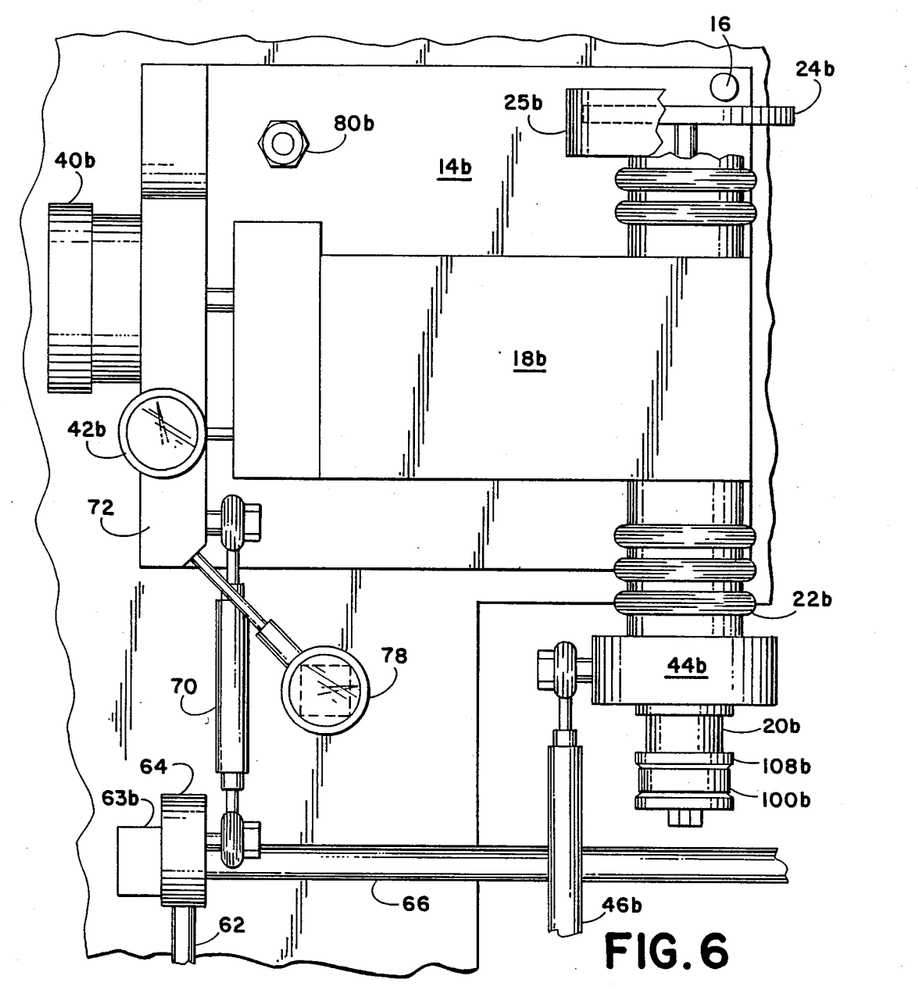
FIG. 6 is a partial top view of the automatic dual side grinding machine of FIG. 1.

Referring to FIGS. 1, 2 and 3, an automatic dual side grinding machine 10 includes a frame 12 which includes a thick top portion 12a. The top portion 12a supports a pair of support plates 14a and 14b which are pivotally mounted about respective vertical axes on top portion 12a. The vertical axis for support plate 14b is shown as pivot pin 16 in FIG. 6 and a similar pivot pin exists for support plate 14a but is not shown. A pair of bushing blocks 18a and 18b support rotary spindles 20a and 20b which are mounted through respective bores (not shown) therein. The spindles 20a and 20b include respective rubber dust covers 22a and 22b. Rotary grinding wheels 24a and 24b and guards 25a and 25b are attached to the ends of the spindles 20a and 20b and grind the teeth of a circular saw 26 which is mounted on a shaft 28 powered by a hydraulic cylinder 30 which causes the teeth 34 of the circular saw 26 to advance one at a time to be reground as will be explained below. As each of the teeth 34 assumes a position for regrinding, a clamping mechanism 36 holds the tooth in place. The shaft 28 and the hydraulic cylinder 30 are mounted on an arm 38 which may accommodate various sizes of saws 26.

The transverse positions of the bushing blocks 18a and 18b may be adjusted by a screw type adjustment provided by adjustment knobs 40a and 40b. The amount of transverse movement is indicated by displacement gauges 42a and 42b.

The spindle assemblies 20a and 20b include clamp bushings 44a and 44b which are connected to respective tie rods 46a and 46b. The tie rod 46b is connected to a lever arm plate 48 coupled to a rotary cam 50. The cam 50 is mounted on a shaft 52 which is driven by a motor 54 through a gear box 56. The shaft 52 is also coupled to a rotary cam 58 which has a flattened portion for actuating a switch 60 which in turn provides a signal for the hydraulic cylinder 30 and the clamp mechanism 36 indicating when to rotate the circular saw 26 so that another tooth 34 is brought into position for grinding.

The lever arm plate 48 is coupled to a similar plate 47 by a rigid shaft 53 (refer to FIGS. 4 and 5) so that the rotation of the cam 50 causes both plates 48 and 47 to move in unison. The plate 47 is coupled to tie rod 46a.

A lever arm 62 is connected to a cam 64 mounted on a shaft 66 which carries a second cam 68 which is identical to cam 64. The shaft 66 is journalled into yokes 63a and 63b. Cam 64 includes an output tie rod 70 coupled to a vertical wall portion 72 which rests on support plate 14b. Similarly, cam 68 has an output tie rod 74 coupled to a vertical wall portion 76 resting on support plate 14a. The support plates 14a and 14b are moveable in the directions indicated by the curved arrows in FIG. 1 as the lever arm 62 is raised or lowered as will be explained below. An indication of the amount of movement is provided by displacement gauge 78 which is coupled to a shaved or beveled portion of vertical wall portion 72. When the support plates 14a and 14b are pivoted to the desired position, they may be held in place by tightening bolts 80a and 80b.

Figure 7:
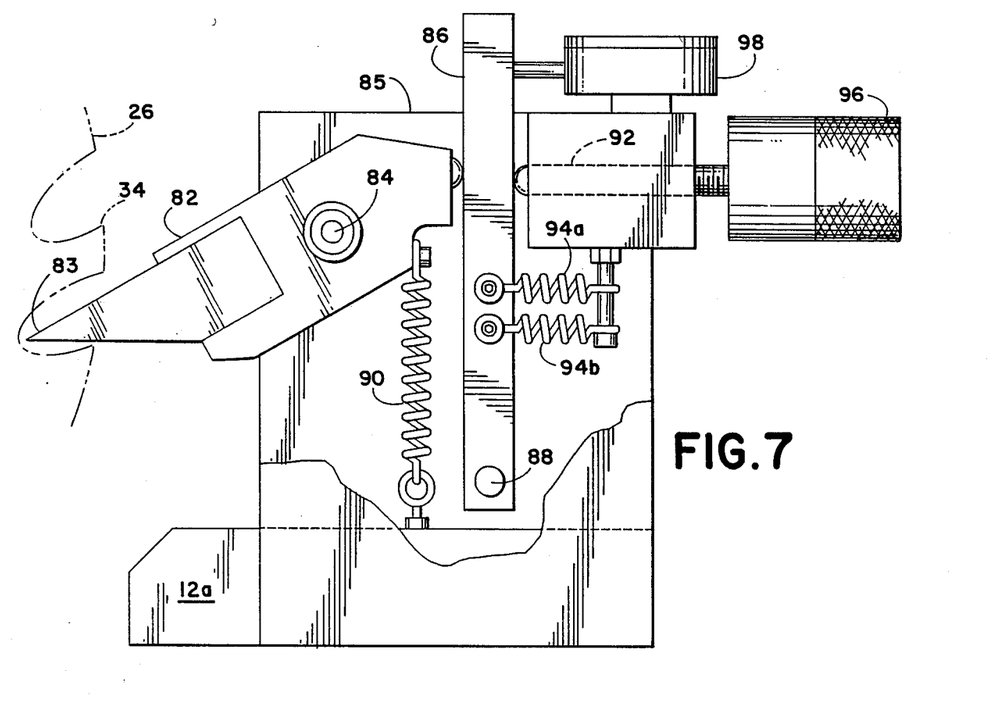
FIG. 7 is a side view of a tangential angle adjustment mechanism.

As best shown in FIG. 7 a tangential angle adjustment device includes an index finger 82 mounted on a pivot 84 secured to a housing 85. The finger 82 has a tip 83 that engages the scalloped portions of the saw blade 26 between the teeth 34. The finger 82 is caused to rotate about its pivot 84 by a lever bar 86 mounted on a pin 88, and is biased against the lever bar 86 by a spring 90. The lever bar 86 is, in turn, biased against a screw-actuated push rod 92 by a pair of springs 94a and 94b. As the push rod 92 is extended by knob 96 the bar 86 pushes against the finger 82 causing it to rotate about its pivot 84. This changes the orientation of the saw teeth 34 in vertical relation to the grinding wheels 24a and 24b. A displacement gauge 98 is callibrated to provide a reading for this adjustment.

Referring now to FIGS. 2 and 3, the spindles 20a and 20b are rotatably driven by drive belts 100a and 100b which comprise the output drive of motors 102a and 102b. Motors 102a and 102b are pivotally mounted on base plates 104a and 104b so that their weight tensions the belts and the base plates are in turn affixed to stationary supports 106a and 106b fastened to the top of the frame 12a.

Figures 8A, 8B:
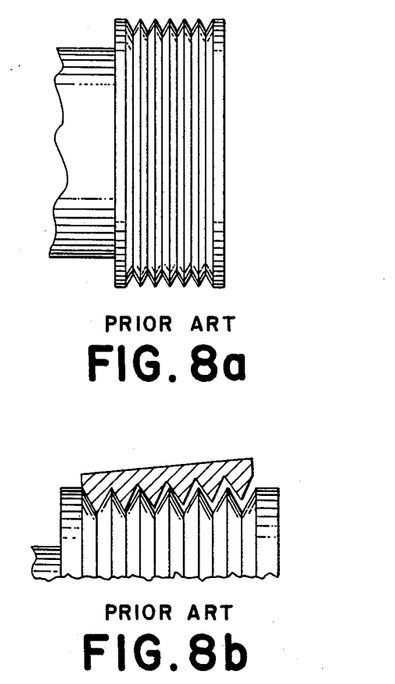
FIG. 8a is partial side view of a prior art poly-V belt pulley.
FIG. 8b is a partial side view of the prior art pulley of FIG. 8a with a misaligned poly-V belt.
Figure 9A:
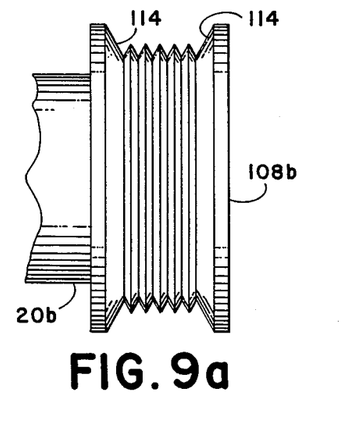
FIG. 9a is a side view of a pulley designed for use with the spindles and output motor drive shafts of the rotary spindle drive components of the present invention.
Figure 9B:
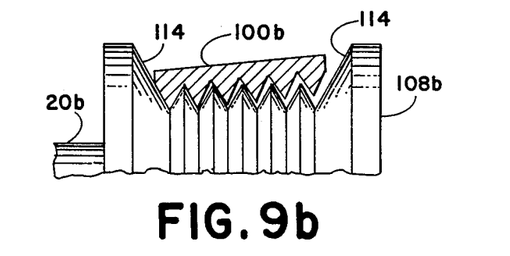
FIG. 9b is a partial side view of the pulley of FIG. 9a and including a partially misaligned poly-V belt.
Figure 10:
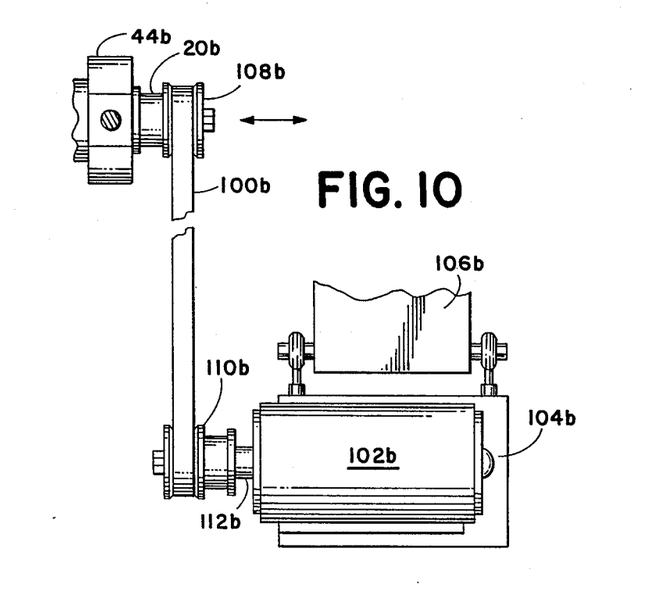
FIG. 10 is a partial cutaway side view of the automatic dual side grinding machine of FIG. 2 showing the rotary belt drive system for the spindles.

As best shown in FIG. 10, the spindle 20b moves reciprocally with respect to the frame in the direction shown by the arrows. The spindle 20a is identical and the following discussion is equally applicable to it and the other spindle rotary drive components on the opposite side of the frame. A pulley 108b. is mounted to the spindle 20b and carries a belt 100b. The belt 100b is looped over a similar pulley 110b affixed to the output shaft 112b of motor 102b. As illustrated best in FIG. 9a, the pulley 108b includes raised beveled edges 114 which serve to confine the belt 100b to the pulley 108b even when the belt 100b becomes misaligned due to the reciprocating motion of the spindle 20b. The prior art pulleys which are illustrated in FIGS. 8a and 8b are those conventionally used with poly-V belts which are highly susceptible to belt slippage if misalignment occurs. In the case of misalignment, force tends to pull the belt off the edge of the pulley because the V-shaped grooves of the belt leave the corresponding V-shaped ridges of the pulley when one pulley moves relative to another. In the arrangement of FIGS. 9a and 9b, however, belt 100b will be contained within pulley 108b despite the misalignment, because movement off of the pulley will be prevented by the raised beveled edges 114. The bevel of edge 114 has the same angle as the grooves for the poly-V belt 100b. It should be understood that the pulley 110b as well as pulleys 108a and 110a include raised beveled edges substantially identical to edges 114 on pulley 108b. These pulleys are designed to be used with poly-V belts which are much less expensive than conventional, heavier drive belts. The problem with such belts has been their tendency to slip or bind up in the case of misalignment. This problem, however, is alleviated by the provision of the beveled edges 114 of the pulleys used herein.

Figure 4:
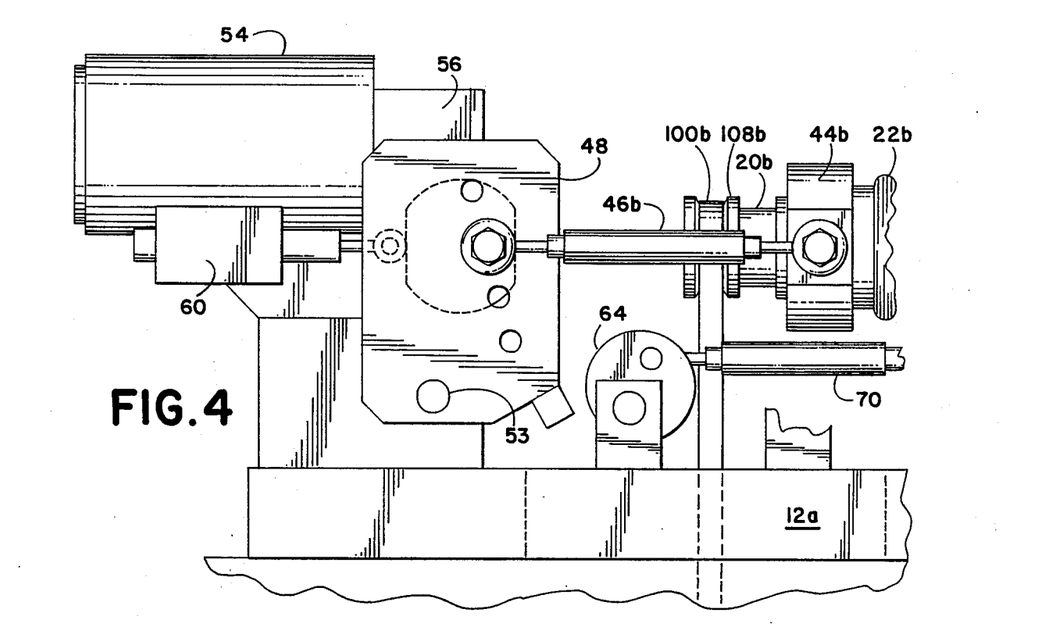
FIG. 4 is a partial side view taken along line B—B of FIG. 1.
Figure 5:
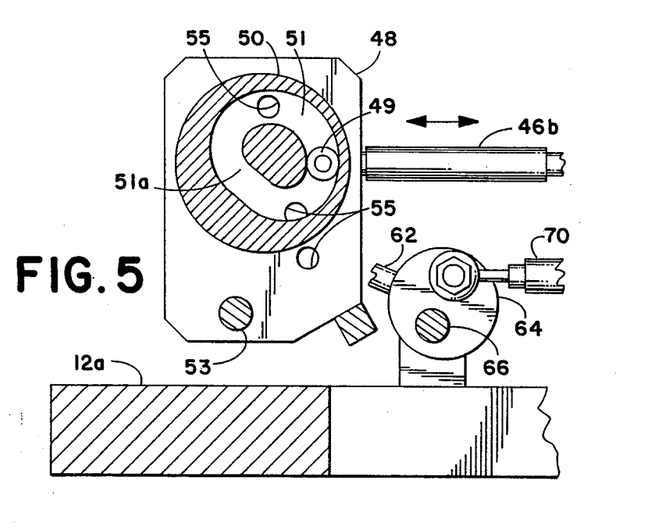
FIG. 5 is a partial sectional side view taken along line A—A of FIG. 1.

Reference is now made to FIGS. 4 and 5 to illustrate the method of operation of the quick retract feature of the reciprocating drive mechanism for the rotary spindles 20a and 20b. The lever arm plate 48 includes a sideways-protruding roller pin 49 which is constrained to travel within a race 51 as cam 50 rotates. The shape of the race translates the rotational motion of cam 50 into the longitudinal reciprocal motion of the spindle 20b via tie rod 46b according to a program of movement which includes a forward grinding stroke at a first rate of speed, followed by a rearward quick retract stroke at a faster rate of speed. The quick retract stroke occurs when the roller 49 engages the straight or flattened portion of the race 51a. The lever arm plate 48 is joined to a lever arm plate 47 on the opposite side by a fixedly-held shaft 53 which is caused to rotate by the motion of lever arm plate 48. The stroke length of the tie rod 46b, and of tie rod 46a on the other side, is adjusted by choosing one of four apertures 55 on plate 48 (on plate 47 for tie rod 46a) as the point of connection for the tie rod 46b.

The tie rods 46b, 46a, 70 and 74 are all mounted on spherical swivels and, therefore, have the ability to pivot sideways in response to adjustments made in the radial angle of attack of the wheels 24a and 24b.

The particular arrangement of the rotary cam 50 and the lever arm plate 48 is not essential to the operation of the invention, it being understood that other cam and rod configurations are possible which would cause the reciprocal motion of spindles 20a and 20b according to the program of movement described herein. For example, a system employing dual output cams bearing against push rods biased against the cams driving the spindles 20a and 20b would be an acceptable alternative design. Still, other types of cam arrangements for converting rotary motion to reciprocal longitudinal motion according to a program of movement including a forward grinding stroke and a quick retract rearward stroke are possible.

In FIGS. 9a, 9b and 10 the poly-V belt 100b has been illustrated as being deeply recessed within the pulley 108b. In actual practice, it is necessary only for the top of the raised beveled portions 114 to just barely exceed the top of the belt 100b as it lies within the pulley 108b in order to prevent the belt from slipping off of the pulley.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A regrinding apparatus for a circular saw comprising:
   (a) a frame supporting a pair of rotary spindles;
   (b) a grinding wheel mounted on each spindle for engaging the teeth of said circular saw from the side; and
   (c) reciprocating means for driving said spindles longitudinally to effect a side grinding motion for said grinding wheels, said reciprocating means including cam means for providing a program of movement for said spindles which includes a forward grinding stroke at a first rate of speed and a rearward quick retract stroke at a second rate of speed, the second rate of speed being faster than the first rate of speed.

2. The regrinding apparatus of claim 1 wherein said cam means comprises a rotary cam member having a drive portion shaped to provide said program of movement by engagement with a driven member coupled to said spindles.

3. The regrinding apparatus of claim 2 wherein said driven member includes lever arm means having a roller for engaging a race journaled in said cam member, said lever arm means including tie rod means coupled to said spindles for coupling the rotary motion of said cam member to the longitudinal motion of said spindles.

4. The regrinding apparatus of claim 3 wherein said lever arm means comprises variable stroke length adjustment means.

5. The regrinding apparatus of claim 4 wherein said lever arm means comprises a pair of lever arm plates fixedly mounted to a common shaft whereby the program of movement imparted to one of said plates by said cam means is transmitted to the other of said plates by said shaft.

6. A regrinding apparatus for a circular saw comprising:
 (a) a frame supporting a pair of rotary spindles, each having a grinding wheel mounted thereon, said spindles mounted on said frame for reciprocating movement to grind the teeth of said saw blade from the side;
 (b) rotary belt drive means mounted to said frame at a fixed location and having a pair of output drive belts;
 (c) a pair of pulleys attached to each of said spindles for receiving each respective drive belt, each said pulley including a recessed portion and having raised beveled edges at either end of the recessed portion to prevent slippage of the belts off of each of the pulleys as the spindles move reciprocally with respect to the rotary belt drive means.

7. The regrinding apparatus of claim 6 wherein the drive belts are poly-V belts.

8. The regrinding apparatus of claim 7 wherein the raised beveled edges of each of said pulleys have a height that just clears the top of each belt as each belt lies in each respective recessed portion.

9. A regrinding apparatus for a circular saw blade comprising:
 (a) a frame supporting a pair of rotary spindles each having a grinding wheel mounted thereon, said spindles mounted on said frame for a reciprocating movement to grind the teeth of said saw blade from the side;
 (b) support plate means for each of said spindles, moveable with respect to said frame about respective vertical axes; and
 (c) adjustment means for simultaneously adjusting the position of both support plate means to provide a radial angle adjustment for said rotary grinding wheels.

10. The regrinding apparatus of claim 9 wherein said adjustment means comprises a lever arm coupled to each support plate means through a linkage whereby movement of said lever arm causes each support plate means to pivot about its vertical axis through the same radial dimension.

11. The regrinding apparatus of claim 10 wherein said linkage comprises a pair of rotary cam members mounted on a common shaft and including output tie rods coupled to each of said support plate means from each of the cam members.

12. In a dual side grinding machine for resharpening the teeth of a circular saw blade, wherein said saw blade is held on a rotatable mounting for advancing the teeth of the saw blade one by one into engagement with an index finger, said index finger rotatably mounted about a pivot axis for holding each tooth to be reground in a predetermined vertical position relative to a pair of grinding wheels, the improvement comprising tangential angle adjustment means comprising lever bar means rotatably mounted about a pin and bearing against said index finger, said lever bar means having biasing spring means urging said lever bar means against push rod means.

13. The dual side grinding machine of claim 12 wherein said biasing spring means comprises a pair of springs coupled between said lever bar means and said push rod means.

* * * * *

UNITED STATES PATENT AND TRADEMARK OFFICE
CERTIFICATE OF CORRECTION

PATENT NO. : 4,901,604

DATED : February 20, 1990

INVENTOR(S) : James Emter

It is certified that error appears in the above-identified patent and that said Letters Patent is hereby corrected as shown below:

Col. 1, line 56, after "The" delete --,--.

Col. 3, line 48, after "is" insert --a--.

Col. 5, line 16, after "108b" delete --.--.

Signed and Sealed this

Twenty-second Day of October, 1991

Attest:

HARRY F. MANBECK, JR.

*Attesting Officer*          *Commissioner of Patents and Trademarks*